United States Patent [19]

Teiser et al.

[11] 4,076,391
[45] Feb. 28, 1978

[54] MAGNIFYING READING DEVICE AND VIEWER

[75] Inventors: Sidney Teiser, Portland, Oreg.; Floyd H. Eliott, 2015 SE. 11th Ave., Portland, Oreg. 97214

[73] Assignees: Floyd H. Eliott; Barbara Ann Eliott, both of Portland, Oreg.

[21] Appl. No.: 741,555

[22] Filed: Nov. 15, 1976

Related U.S. Application Data

[63] Continuation-in-part of Ser. No. 700,464, Jun. 28, 1976, abandoned.

[51] Int. Cl.² .......................... G02B 27/02; G02B 7/00
[52] U.S. Cl. ........................................ 350/241; 350/247
[58] Field of Search .......................... 350/235–241, 350/247, 243–244, 250, 142–143

[56] References Cited

U.S. PATENT DOCUMENTS

| 1,460,923 | 7/1923 | Searle | 350/238 |
| 1,892,745 | 1/1933 | Bolich | 350/250 |
| 2,604,009 | 7/1952 | Walrath | 350/241 |

FOREIGN PATENT DOCUMENTS

| 800,695 | 7/1936 | France | 350/241 |
| 1,220,802 | 1/1971 | United Kingdom | 350/239 |
| 14,182 of | 1908 | United Kingdom | 350/244 |
| 953,388 | 3/1964 | United Kingdom | 350/237 |

OTHER PUBLICATIONS

Circon "Luminated Micromagnifier," Advertisement Circon Corp., Santa Barbara Airport, Boleta, Cal. 93017, 2-1-73.

*Primary Examiner*—John K. Corbin
*Assistant Examiner*—Wm. H. Punter
*Attorney, Agent, or Firm*—Eugene M. Eckelman

[57] ABSTRACT

A body member arranged to be supported on a table or other support has a telescope-type magnifying device supported thereon. In one embodiment, the body member has a transversely movable reading material holder adjustable toward and away from the magnifying device to provide focusing. Such holder may be completely removed for use of the magnifying device in viewing other objects below the body member. In another embodiment, a telescope-type magnifying device has up and down movement as well as lateral movement and is used with a stationary reading material holder. This second embodiment has a friction clamp for holding the magnifying device in a selected raised position.

2 Claims, 9 Drawing Figures

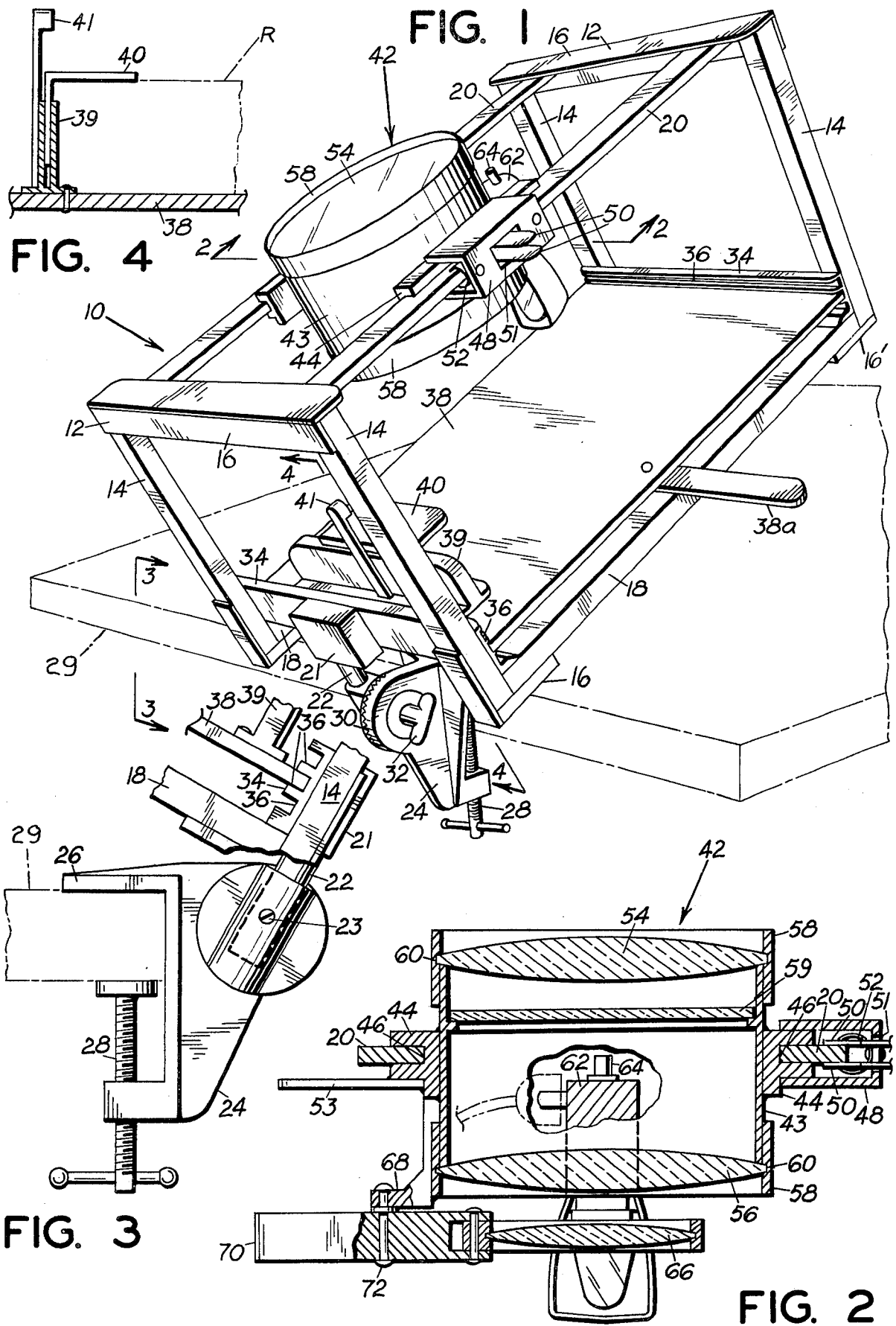

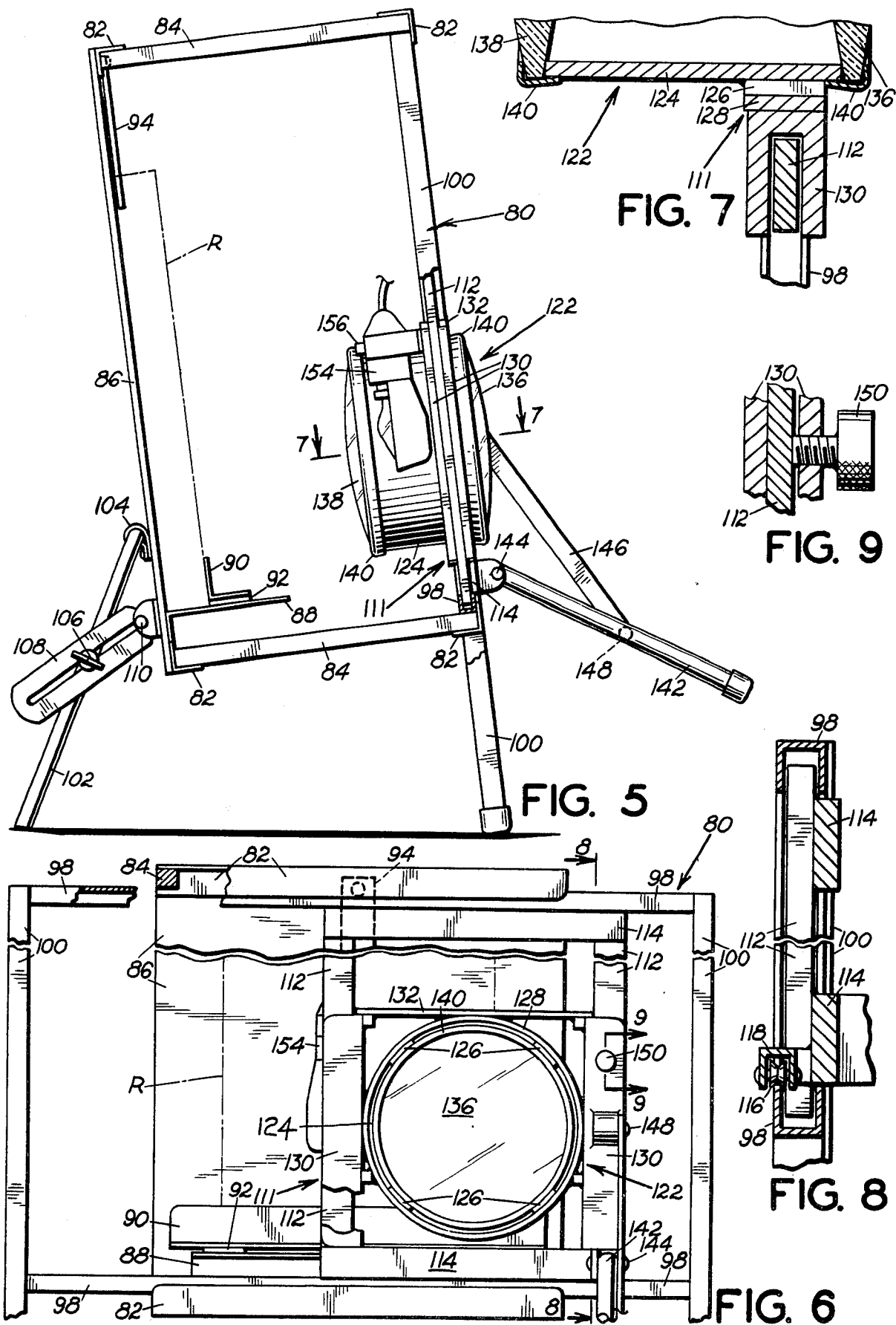

MAGNIFYING READING DEVICE AND VIEWER

REFERENCE TO PRIOR APPLICATIONS

This application is a continuation-in-part of application Ser. No. 700,464, filed June 28, 1976 entitled Magnifying Reading Device and Viewer and now abandoned.

BACKGROUND OF THE INVENTION

This invention relates to new and useful improvements in reading devices.

Persons with impaired vision usually attempt to read by scanning the reading material with a magnifying glass held in the hand and the reading material held in the other hand. In such situations, difficulty ensues in that either the hand holding the magnifying glass is not steady enough or the hand holding the reading material is not steady enough. Either situation made reading difficult. After awhile, such reading becomes uncomfortable and tiring. The present device was conceived and produced to relieve this condition and to make easier reading for those with impaired sight.

Some devices have heretofore been proposed which support the article to be read and some hold a magnifying device in a firm position. Some even do both but their operation is either unsatisfactory or too complex. None of them provides easy, comfortable and efficient reading for those suffering impairment of vision.

SUMMARY OF THE INVENTION

According to the present invention, a body member is provided having means for supporting reading material and including adjustable structure such that an area considerably larger than the magnifying lens can be viewed. In one embodiment, the reading material holder is movable transversely and the magnifying lens is movable up and down to accomplish full viewing of reading material. In another embodiment, a magnifying lens is movable up and down as well as transversely to accomplish the same purpose.

A primary objective of the present invention is thus to provide a simplified reading device which is effective in presenting reading material in enlarged image at maximum convenience to a reader.

Another object is to provide a reading device of the type described which covers a large viewing area, accomplished by means providing up and down and transverse viewing of reading material on a holder.

Another object is to provide a reading device of the type described which employs support means adapted to be tilted to a desired angle of selected convenience for the reader, and furthermore to provide adjustment for proper focusing of the magnifying device.

The invention will be better understood and additional objects and advantages will become apparent from the following description taken in connection with the accompanying drawings which illustrate a preferred form of the device.

BRIEF DESCRIPTION OF THE DRAWINGS

FIG. 1 is a perspective view of a first form of the present magnifying reading device and viewer;

FIG. 2 is an enlarged sectional view taken on the line 2—2 of FIG. 1;

FIG. 3 is an enlarged fragmentary elevational view taken on the line 3—3 of FIG. 1;

FIG. 4 is an enlarged fragmentary sectional view taken on the line 4—4 of FIG. 1;

FIG. 5 is a side elevational view, partly broken away, of a second form of magnifying reading device and viewer embodying features of the invention;

FIG. 6 is a foreshortened front elevational view, also partly broken away, of the reading device of FIG. 5;

FIG. 7 is an enlarged fragmentary sectional view taken on the line 7—7 of FIG. 5;

FIG. 8 is an enlarged fragmentary sectional view taken on the line 8—8 of FIG. 6; and FIG. 9 is an enlarged fragmentary sectional view taken on the line 9—9 of FIG. 6.

DETAILED DESCRIPTION OF A PREFERRED EMBODIMENT

The invention as defined herein comprises a reading device for persons with impaired vision but it is to be understood that it was designed for any use wherein it is desired that material be magnified for viewing. Thus, it can also be used to view maps, pictures, drawings, fabrics, minute tool parts, postage stamps, coins, and the like.

With particular reference to the drawings, a first embodiment of the present reading device is shown in FIGS. 1-4 and includes an open box-like body member 10 having upper and lower frames 12 made up of two or more frame members 14 extending from front to rear and transverse frame members 16 secured thereto. The two frames 12 are secured together by longitudinal frame members 18 and 20. The various frame portions of the body member are secured together in integral relation to provide a sturdy integrated structure.

A bottom portion of the body member has a support block 21 integral with a cross member hereinafter to be described. This block supports a depending post 22 which projects below the bottom of such frame 10, best seen in FIG. 3. The bottom end of this post is removably secured as by a setscrew 23 in a socket portion of a C-type clamp 24 having a jaw 26 and a clamp screw 28 between which the edge of a table 29 or the like may be clamped. Clamp 24 has toothed interengaging portions 30 on that portion that receives the post 22 and the clamp portion 24, and such toothed portions hold the two parts non-rotatably but releasably together for relative rotative positioning by operation of a hand screw 32. By means of this structure, the body member 10 can be adjusted to various tilted angles for accommodating the reader.

Secured transversely on side members 14 at the rearward end of the viewer and on the inside of the members 14 are support rails 34 having inwardly facing opposed grooves 36 extending longitudinally thereof and arranged to receive a flat plate-like holder 38 therebetween for supporting reading material, the holder having a handle 38a projecting from one side for manually moving it. The bottom rail 34 supports the block 21. A plurality of grooves 36 are provided in each rail 34 to adjust the holder toward and away from the upper portion of the body member, for a purpose to be described. Holder 38 has a forwardly directed flange 39, also seen in FIG. 4, secured thereto and arranged to provide a rest for reading material designated by R. This flange has a slot opening through the front thereof and this slot slidably receives a right angle hold-down arm 40 arranged to engage the reading material if necessary and hold it flat on the holder 38. A stop finger 41 is disposed parallel with and in the path of the hold-down plate 40 to limit its forward movement and to prevent displacement thereof.

The frame members 20 comprise support rails for a magnifying device 42 having a round housing 43 provided with a bracket 44 on each side. Each of the brackets has an outwardly facing recess 46 slidably receiving the rails 20 whereby the magnifying device 42 can be moved longitudinally on such rails. One of the brackets 44 integrally carries a laterally extending housing 48 having a pair of clamp fingers 50 extending through an opening 51 in the outer wall thereof and arranged to releasably clamp the associated rail 20 under the action of a spring 52 arranged such that it normally forces the fingers 50 against said rail but allows the fingers to release the rail upon manual squeezing of the outer end of the fingers together. Thus, to adjust the magnifying device, the fingers 50 are manually squeezed together and the device moved to a position desired. Upon release of the fingers, the magnifying device will be held in the adjusted position on the rails. A handle 53 is secured on that bracket 44 that is opposite from the clamp housing 48 to assist the operator in moving the magnifying device 42.

The magnifying device 42 employs a pair of lenses 54 and 56 disposed in spaced relation at the front and rear ends thereof to accomplish a telescope-type viewing. Lenses 54 and 56 are held in place by bands 58 having inner grooves 60 receiving the outer edge portion of the lenses. The bands 58 are frictionally or otherwise secured on the body of the magnifying device and support the lens such that the outermost surface portion of the lens is disposed inwardly from the edge of the band, thus providing protection for the lens. One or more filters 59 may be provided in the magnifying device 42 to make better contrast of the reading material. A yellow filter is especially good to provide the desired contrast and preferably is located at a point adjacent to the top lens 54.

The magnifying device 42 supports a lamp assembly 62 to provide reading light when necessary. An on/off switch 64 is mounted on the lamp assembly for controlling its operation.

An auxiliary lens 66 is pivotally supported in back of the magnifying device 42 by a bracket 68. Such lens has a handle portion 70 that projects outwardly beyond the side of the magnifying device 42, and pivotal support of the auxiliary lens is accomplished by a pin 72 extending through the bracket 68 and handle. The auxiliary lens 66 is adapted to increase the magnification of the magnifying device 42 and may be swung into a use position under the magnifying device 42 when desired. It is used when it is desired that the magnification be greater than that produced by the magnifying device 42.

In the operation of the reading device of FIG. 1, it is clamped to the edge of a table or other support, and the body member 10 is tilted for best viewing by the reader by adjustment of clamp 24. The article to be read is placed on the holder 38 and held in place by the hold down means 40 if necessary. Reading is then accomplished through the magnifying device 42, and where the area to be read is larger than what can be viewed through the magnifying device at one time, the magnifying device is moved longitudinally of the body member and holder 38 is moved laterally. By the combined movement of the magnifying device 42 and the holder 38, reading material as large as the holder 38 and even larger in the lateral direction can be viewed. If additional magnification is desired, the auxiliary lens 66 is swung into place under the device 42. Proper focusing of the lens type magnifying device 42 is accomplished by the support of holder plate 38 in a selected groove 36.

The embodiment of FIG. 1 also has the advantage that it can be used for purposes other than for viewing reading material such as for viewing postage stamps, coins, etc. The article to be viewed can be supported on the holder 38 or since the holder 38 is removable from the ends of the rails 34, such holder can be taken out if it is desired to support the article on the table surface or to hold it by hand.

In the embodiment of FIGS. 5–9, the reading device includes a body member 80 having upper and lower transverse frame members 82 secured together by frame members 84 extending from front to rear. A plate-like back wall 86 is secured to the rear upper and lower transverse frame members 82. Back wall 86 has a forwardly projecting flange 88 secured thereto adjacent the bottom thereof comprising a holder for reading material R. Flange 88 is constructed of a magnetizable metal and is associated with a right angle bracket 90 having a magnet 92 secured thereto, whereby the bracket can be adjustably positioned on the flange 88 to bear against an article of reading material R if desired. In addition, a depending tab 94 is pivotally supported on an upper rear frame member 82 and can be pivoted in a downward position to assist in holding reading material if necessary. This tab is used only on thin articles of reading material and would not be used on a thick article of the type shown in FIG. 5. Instead the tab would be swung up out of the way.

Secured transversely to front frame members 83 are opposed channel frame members 98 that extend beyond the ends of the frame members 82, and secured to the opposite ends of channel frame members 98 are upright frame members 100 that extend below the bottom channel frame member 98 and form front legs.

The rear portion of the body member 80 is supported by a single rear leg 102 pivotally connected at its upper end at 104 to the rear of back wall 86. Rear leg 102 has a laterally extending clamp stud 106 associated with a slotted link 108 having a pivotal connection 110 with the back wall 86 below the pivotal connection 104. The association of the leg 102 and the slotted link 108 is such that the leg can be pivotally positioned to any position to vary the tilted support of the body member 60. The leg can be swung up against the back wall 86 and this also brings the link 108 up against the back wall for packing and storage.

The transverse channel frame members 98 comprise guide and support rails for a movable carriage 111 having upright frame members 112 secured together by upper and lower cross frame members 114. As best seen in FIG. 8, the upper ends of upright frame members 112 project into the upper channel frame member 98 for guided lateral movement and the lower end of members 112 similarly project into lower channel frame members 98. Movable support, however, for the carriage 111 is accomplished by wheel assemblies 116 incorporated in an inverted channel-shaped member 118 secured to the rear of bottom transverse frame member 114. The wheels 116 ride on a rear edge of transverse channel frame member 98 and provide substantially friction free transverse movement of the carriage.

A magnifying device 122 having a round body portion 124 has support inside of a plurality of projections 126 integral with an outer annular support frame 128 in turn integral with opposite outwardly facing channel members 130 which have slidable guided movement on the upright frame members 112. In addition to being secured to the support ring 128, the side channel members 130 are secured together at the top by a connecting strip 132.

The magnifying device 122 employs a pair of lenses 136 and 138 held in place by bands 140 on the body portion 124. The use of two lenses in combination provides a clear telescope-type image of reading material supported at the rear of the holder. The body member 124 is frictionally supported within the projections 126 and is adjustable forwardly and rearwardly to obtain proper focus according to the reader's eyesight. The friction support of the body member 124 is such that it will remain fixed where adjusted.

Transverse movement of the carriage 111 and up and down movement of the magnifying device 122 in the carriage is accomplished by a handle 142 having a pivotal connection 144 at one of its ends to the lower transverse frame member 114 at one side, and a link 146 has pivot connections 148 at its opposite ends between an intermediate portion of the handle and a side channel 130 of the carriage 111. By pivoting the handle 142 up and down, the magnifying device will similarly move up and down. It may be desired to anchor the magnifying device at a selected raised position, and for this purpose a setscrew 150, best seen in FIG. 9, has threaded engagement in the channel member 130 for abutment against the upright member 112. The setscrew 150 is loosened for free movement and is tightened for controlled movement or fixed positioning of the magnifying device. The side channel members 130 extend down below the plane of the support ring 128 so as to abut against the bottom transverse member 114 and form a stop to prevent damage to the magnifying device.

A lamp assembly 154 is secured on one of the channel members 130 of the carriage to provide reading light. This lamp assembly has an on-off switch 156 for controlling its operation.

In the operation of the embodiment of FIG. 5, it is seated on a supporting surface and adjusted to the desired upright angle by the rear leg 102. An article to be read is placed on the flange 88 and held in place by the bracket 90 and possibly by the upper tab 94. Where the article to be read is larger than that what can be viewed through the magnifying device, the latter is moved transversely and vertically by operation of the handle 142. If it is desired to anchor the magnifying holding frame in a set position or to restrict free movement thereof, the setscrew 150 is adjusted accordingly.

The device provides an efficient holder for material to be read and is particularly useful for persons with unsteady hands. It is capable of scanning large areas in a convenient manner and has the important advantage of maintaining a constant or parallel distance between the lens and the reading material in all scanning positions. Also, the lens is supported so that the line of sight is always at right angles to the reading material to also provide maximum efficiency for viewing.

It is to be understood that the forms of our invention herein shown and described are to be taken as preferred examples of the same and that various other changes in the shape, size and arrangement of parts may be resorted to without departing from the spirit of our invention, or the scope of the subjoined claims.

Having thus described our invention, we claim:

1. A reading device comprising
   a. a body member having forward and rearward ends and top and bottom portions,
   b. a reading material holder on said body member adjacent the rearward end thereof,
   c. a carriage on said body member having a movable support frame adjacent the forward end of said body member,
   d. magnifying means on said support frame,
   e. said carriage being movable transversely on said body member and said support frame being movable up and down on said carriage to view through said magnifying means an area larger than the latter by combined up and down and transverse movements,
   f. a handle pivotally connected at one of its ends to said carriage,
   g. and a link pivotally connected between said handle and said movable frame whereby said support frame is movable to raised and lowered positions by pivotal adjustment of said handle.

2. The reading device of claim 1 including releasable anchor means between said carriage and said support frame to hold the latter in selected fixed positions.

* * * * *